(12) United States Patent
Kim et al.

(10) Patent No.: US 11,870,556 B2
(45) Date of Patent: Jan. 9, 2024

(54) RADIO LINK MONITORING

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 499 days.

(21) Appl. No.: 17/269,967

(22) PCT Filed: Oct. 4, 2019

(86) PCT No.: PCT/KR2019/013033
§ 371 (c)(1),
(2) Date: Feb. 19, 2021

(87) PCT Pub. No.: WO2020/071851
PCT Pub. Date: Apr. 9, 2020

(65) Prior Publication Data
US 2021/0351886 A1    Nov. 11, 2021

(30) Foreign Application Priority Data
Oct. 5, 2018   (KR) ........................ 10-2018-0118852

(51) Int. Cl.
*H04L 5/04* (2006.01)
*H04L 5/00* (2006.01)
*H04W 16/14* (2009.01)

(52) U.S. Cl.
CPC .......... *H04L 5/0048* (2013.01); *H04W 16/14* (2013.01)

(58) Field of Classification Search
CPC combination set(s) only.
See application file for complete search history.

(56) References Cited

U.S. PATENT DOCUMENTS

| 2020/0146063 A1* | 5/2020 | Xu | H04W 24/08 |
| 2020/0274657 A1* | 8/2020 | Deenoo | H04W 36/0058 |
| 2021/0127345 A1* | 4/2021 | Shi | H04W 56/003 |
| 2021/0274559 A1* | 9/2021 | Hwang | H04W 74/0833 |

FOREIGN PATENT DOCUMENTS

WO   2018143776   8/2018

OTHER PUBLICATIONS

PCT International Application No. PCT/KR2019/013033, International Search Report dated Jan. 15, 2020, 4 pages.
(Continued)

*Primary Examiner* — Hashim S Bhatti
(74) *Attorney, Agent, or Firm* — LEE, HONG, DEGERMAN, KANG & WAIMEY

(57) ABSTRACT

Provided are a method for radio link monitoring. According to an embodiment of the present disclosure, the method includes detecting, by a physical layer of the wireless device, that a reference signal (RS) on an unlicensed frequency is not transmitted in a current period, considering, by the physical layer, that a radio link status of the current period is identical to a radio link status of a previous period, and informing, by the physical layer to a radio resource control (RRC) layer of the wireless device, the radio link status of the current period in the current period.

15 Claims, 19 Drawing Sheets

(56) References Cited

OTHER PUBLICATIONS

LG Electronics Inc., "Impact of LBT failure on RLM," 3GPP TSG-RAN WG2 #103 Meeting, R2-1812800, Aug. 2018, 4 pages.
Ericsson, "RRM framework in NR-U," 3GPP TSG-RAN WG2 103, TDoc R2-1812377, Aug. 2018, 6 pages.
Interdigital Inc., "RLM/RLF for NR-U," 3GPP TSG-RAN WG2 Meeting #103, R2-1811454, Aug. 2018, 5 pages.
Mediatek Inc., "[M153] Corrections on RLM/RLF remapping," 3GPP TSG-RAN WG2 Meeting #103, R2-1811116, Aug. 2018, 5 pages.

\* cited by examiner

RADIO LINK MONITORING

CROSS-REFERENCE TO RELATED APPLICATIONS

This application is the National Stage filing under 35 U.S.C. 371 of International Application No. PCT/KR2019/013033, filed on Oct. 4, 2019, which claims the benefit of earlier filing date and right of priority to KR Application No. 10-2018-0118852, filed on Oct. 5, 2018, the contents of which is hereby incorporated by reference herein in its entirety.

TECHNICAL FIELD

The present disclosure relates to radio link monitoring on unlicensed frequency.

BACKGROUND

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

SUMMARY

In a prior art, a physical layer of a wireless device may transmit Out-Of-Sync (OOS) indication or In-Sync (IS) indication to RRC layer based on reference signal (RS) for Radio Link Monitoring procedure (hereinafter, RLM-RS). On unlicensed frequency, the network cannot transmit RLM-RS if it fails to occupy the unlicensed channel due to LBT failure. When the physical layer detects that the RLM-RS is not transmitted, there is no behavior defined regarding the RLM procedure, i.e. whether to transmit OOS indication or IS indication.

According to an embodiment of the present disclosure, a method performed by a wireless device in a wireless communication system is provided. The method may comprise detecting, by a physical layer of the wireless device, that a reference signal (RS) on an unlicensed frequency is not transmitted in a current period, considering, by the physical layer, that a radio link status of the current period is identical to a radio link status of a previous period, and informing, by the physical layer to a radio resource control (RRC) layer of the wireless device, the radio link status of the current period in the current period.

The present disclosure can have various advantageous effects.

For example, the declaring unnecessary RLF may be prevented, by re-transmitting the indication transmitted in the previous period.

For example, appropriate RLF without delaying may be declared, by re-transmitting the indication transmitted in the previous period.

For example, by scaling the confidence interval based on the experiences, the reliability of the indication predicted by physical in UE may be improved and RRC layer may make correct decision for RLF declaration.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
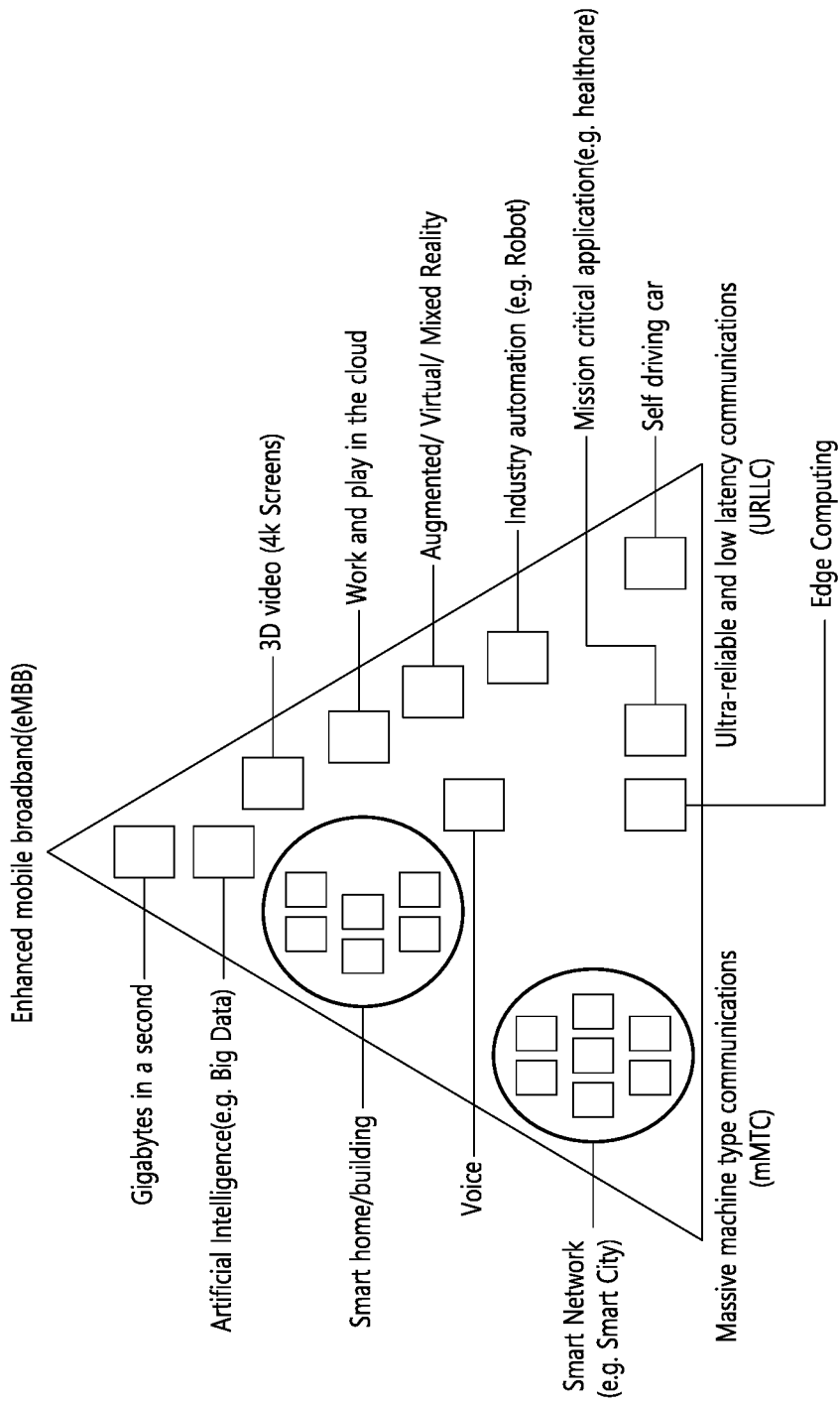
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "I" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
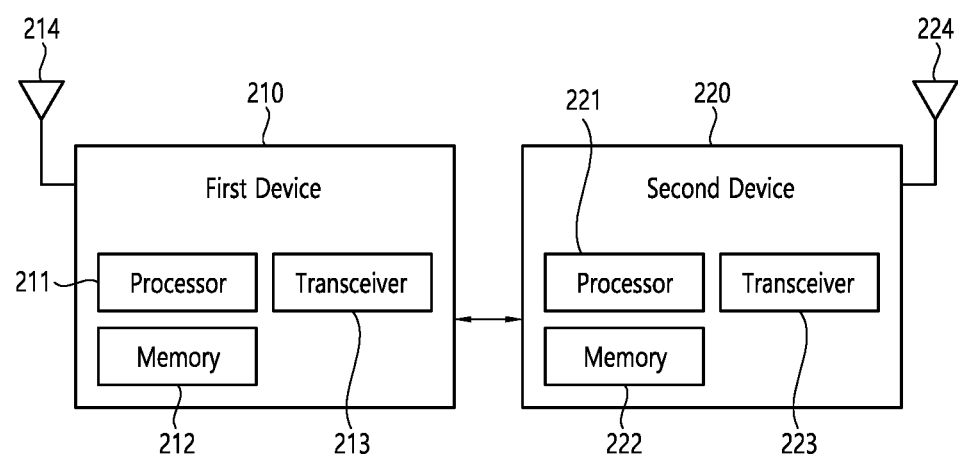
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
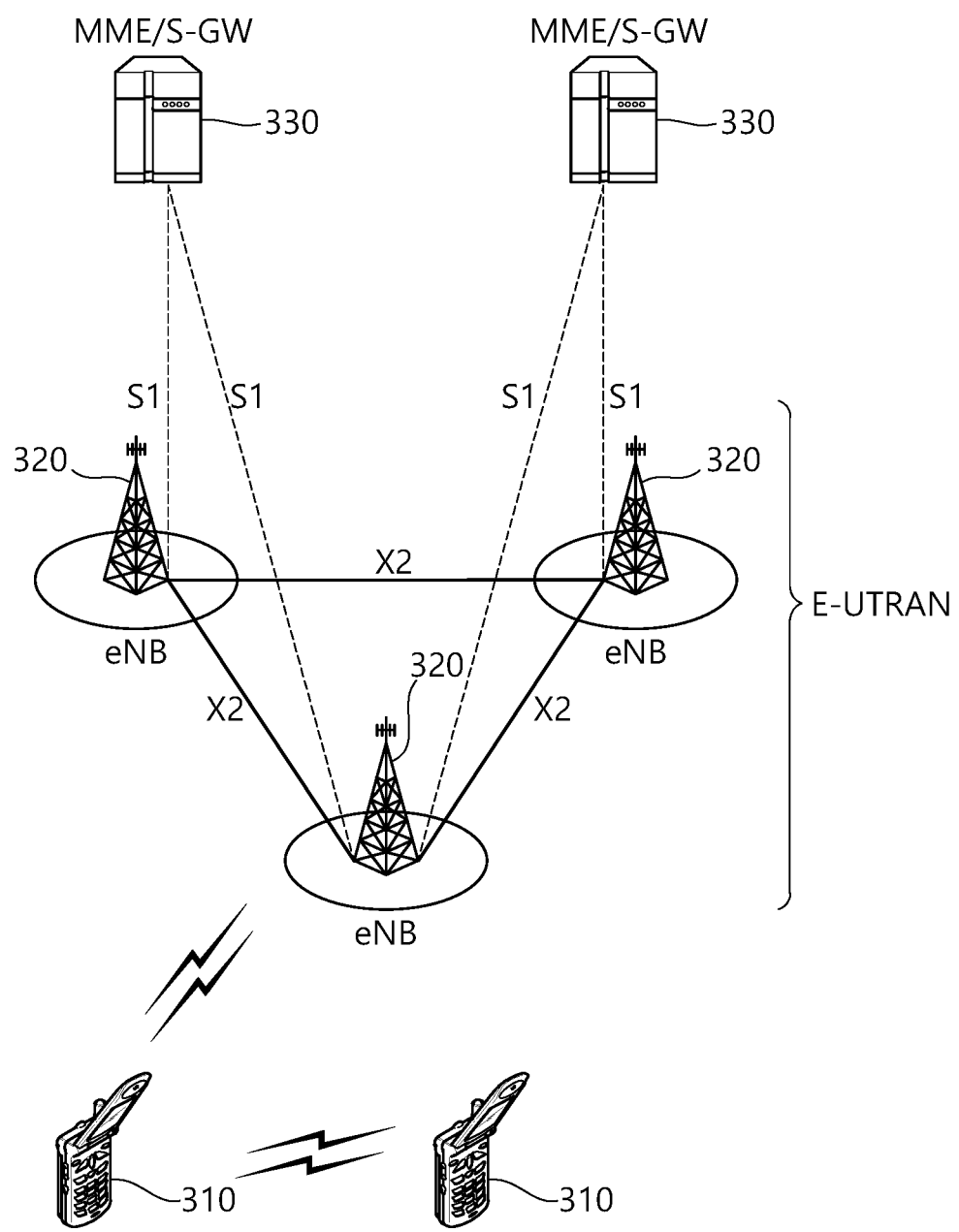
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
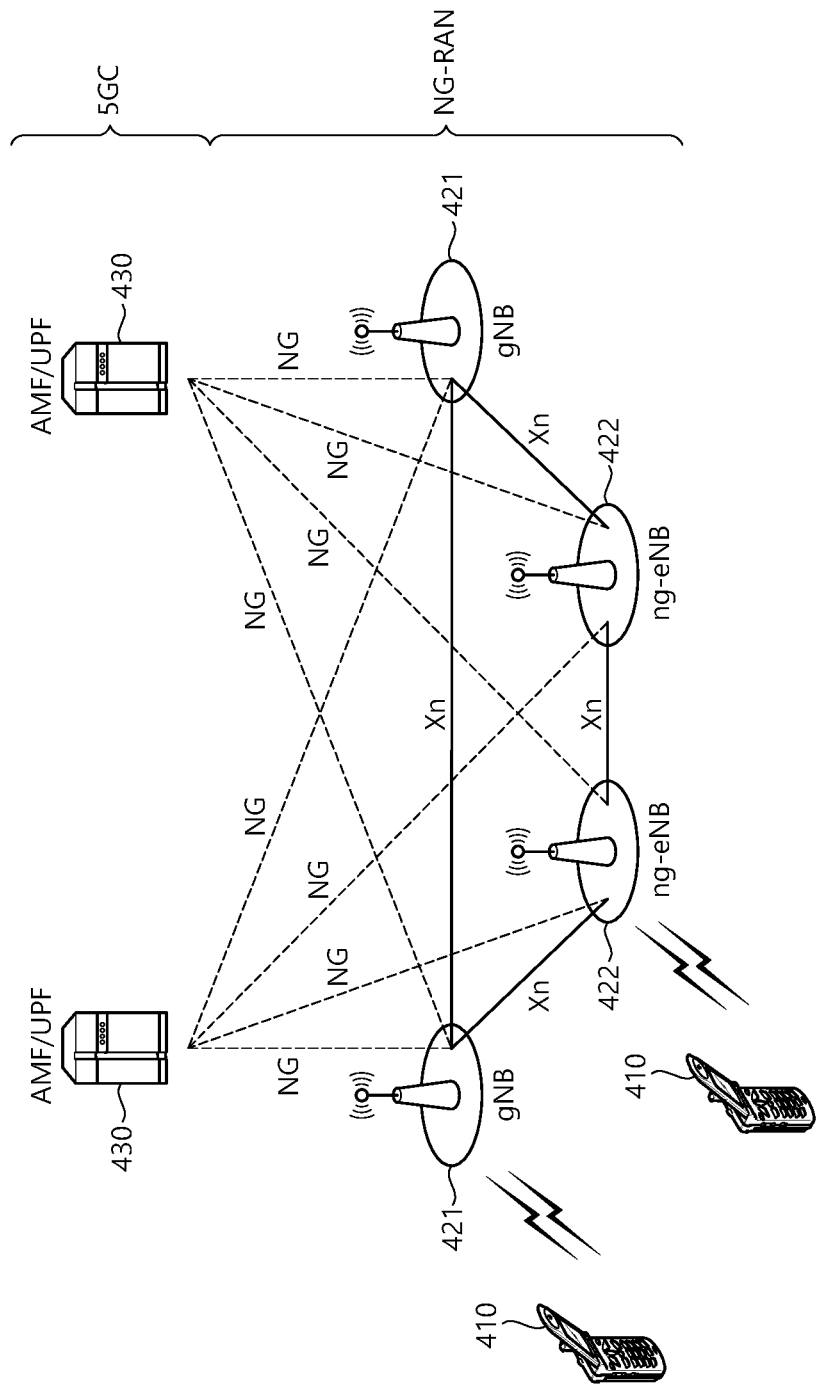
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
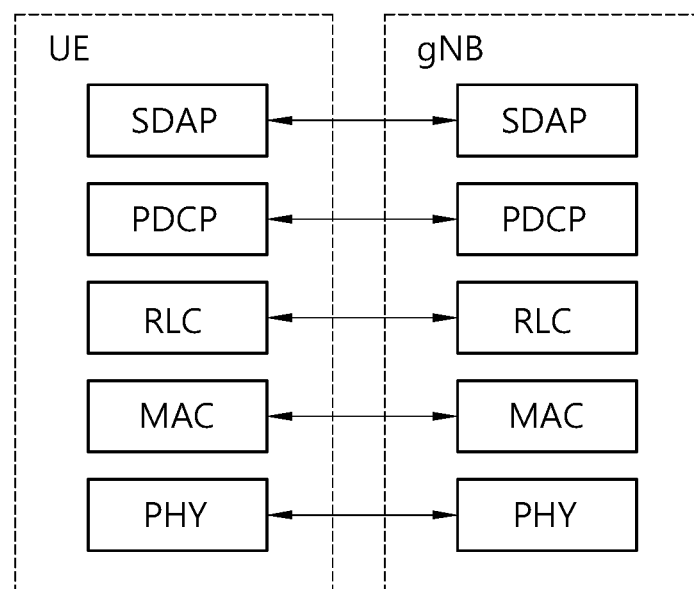
FIG. 5 shows a block diagram of a user plane protocol stack to which the technical features of the present disclosure can be applied.
Figure 6:
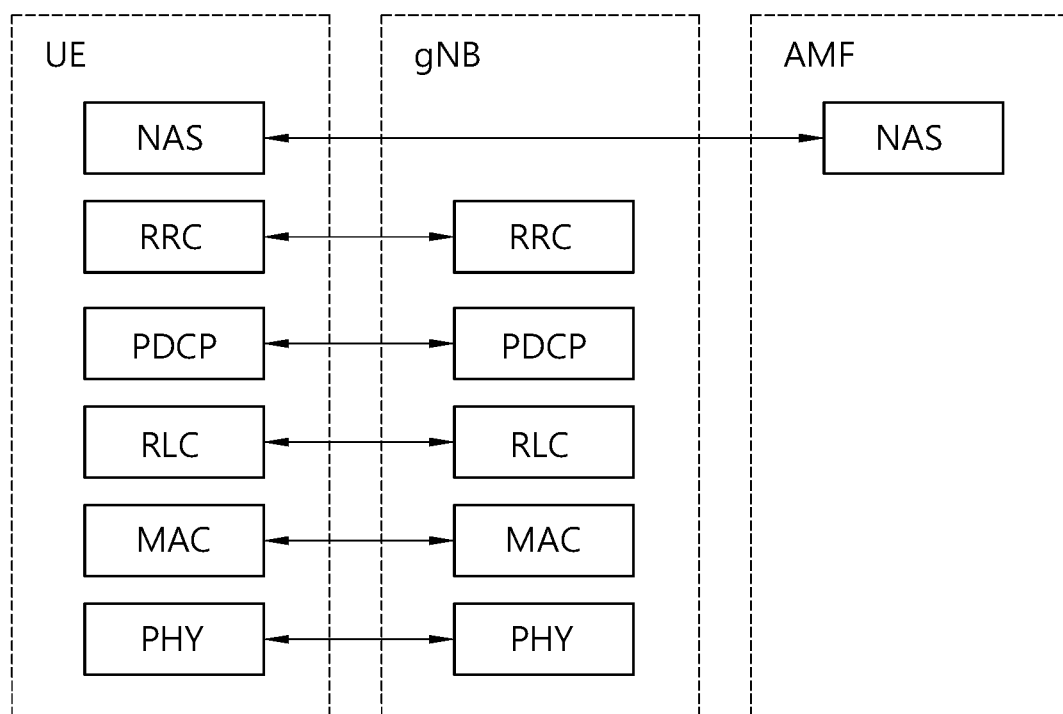
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

The network may configure the UE to derive RSRP, RSRQ and SINR measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS).

The UE shall:
1> for each cell measurement quantity to be derived based on SS/PBCH block:
2> if nrofSS-BlocksToAverage in the associated measObject is not configured; or
2> if absThreshSS-BlocksConsolidation in the associated measObject is not configured; or
2> if the highest beam measurement quantity value is below absThreshSS-BlocksConsolidation:
3> derive each cell measurement quantity based on SS/PBCH block as the highest beam measurement quantity value;
2> else:
3> derive each cell measurement quantity based on SS/PBCH block as the linear average of the power values of the highest beam measurement quantity values above absThreshSS-BlocksConsolidation where the total number of averaged beams shall not exceed nrofSS-BlocksToAverage;
2> apply layer 3 cell filtering;
1> for each cell measurement quantity to be derived based on CSI-RS:
2> consider a CSI-RS resource to be applicable for deriving cell measurements when the concerned CSI-RS resource is included in the csi-rs-ResourceCellMobility including the physCellId of the cell in the CSI-RS-ConfigMobility in the associated measObject;
2> if nrofCSI-RS-ResourcesToAverage in the associated measObject is not configured; or
2> if absThreshCSI-RS-Consolidation in the associated measObject is not configured; or
2> if the highest beam measurement quantity value is below absThreshCSI-RS-Consolidation:
3> derive each cell measurement quantity based on applicable CSI-RS resources for the cell as the highest beam measurement quantity value;
2> else:
3> derive each cell measurement quantity based on CSI-RS as the linear average of the power values of the highest beam measurement quantity values above absThreshCSI-RS-Consolidation where the total number of averaged beams shall not exceed nroCSI-RS-ResourcesToAverage;
2> apply layer 3 cell filtering.

The cell measurement quantity based on SS/PBCH block (hereinafter, SSB based measurement) is one of SS reference signal received power (SS-RSRP), SS reference signal received quality (SS-RSRQ) and SS signal-to-noise and interference ratio (SS-SINR).

SS-RSRP is defined as the linear average over the power contributions of the resource elements that carry secondary synchronization signals. The measurement time resource(s) for SS-RSRP are confined within SS/PBCH Block Measurement Time Configuration (SMTC) window duration.

SS-RSRQ is defined as the ratio of N?SS-RSRP/NR carrier RSSI, where N is the number of resource blocks in the NR carrier RSSI measurement bandwidth. The measurements in the numerator and denominator shall be made over the same set of resource blocks. NR carrier Received Signal Strength Indicator (NR carrier RSSI), comprises the linear average of the total received power observed only in certain OFDM symbols of measurement time resource(s), in the measurement bandwidth, over N number of resource blocks from all sources, including co-channel serving and non-serving cells, adjacent channel interference, thermal noise etc. For cell selection, the measurement time resources(s) for NR Carrier RSSI are not constrained. Otherwise, the measurement time resource(s) for NR Carrier RSSI are confined within SS/PBCH Block Measurement Time Configuration (SMTC) window duration.

SS-SINR is defined as the linear average over the power contribution of the resource elements carrying secondary synchronization signals divided by the linear average of the noise and interference power contribution over the resource elements carrying secondary synchronization signals within the same frequency bandwidth. The measurement time resource(s) for SS-SINR are confined within SS/PBCH Block Measurement Time Configuration (SMTC) window duration.

The cell measurement quantity based on CSI-RS (hereinafter, CSI-RS based measurement) is one of CSI reference signal received power (CSI-RSRP), CSI reference signal received quality (CSI-RSRQ) and CSI signal-to-noise and interference ratio (CSI-SINR).

CSI-RSRP is defined as the linear average over the power contributions of the resource elements of the antenna port(s) that carry CSI reference signals configured for RSRP measurements within the considered measurement frequency bandwidth in the configured CSI-RS occasions.

CSI-RSRQ is defined as the ratio of N?CSI-RSRP to CSI Received Signal Strength Indicator (CSI-RSSI), where N is the number of resource blocks in the CSI-RSSI measurement bandwidth. The measurements in the numerator and denominator shall be made over the same set of resource blocks.

CSI-RSSI comprises the linear average of the total received power observed only in OFDM symbols of measurement time resource(s), in the measurement bandwidth, over N number of resource blocks from all sources, including co-channel serving and non-serving cells, adjacent channel interference, thermal noise etc. The measurement time resource(s) for CSI-RSSI corresponds to OFDM symbols containing configured CSI-RS occasions.

CSI-SINR is defined as the linear average over the power contribution of the resource elements carrying CSI reference signals divided by the linear average of the noise and interference power contribution over the resource elements carrying CSI reference signals reference signals within the same frequency bandwidth.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Radio link failure related actions are described.

Regard detection of physical layer problems in RRC_CONNECTED, the UE shall:
1> upon receiving N310 consecutive "out-of-sync" indications for the SpCell from lower layers while neither T300, T301, T304, T319 not T311 is running:
2> start timer T310 for the corresponding SpCell.

Regarding recovery of physical layer problems, upon receiving N311 consecutive "in-sync" indications for the SpCell from lower layers while T310 is running, the UE shall:
1> stop timer T310 for the corresponding SpCell.

In this case, the UE maintains the RRC connection without explicit signalling, i.e. the UE maintains the entire radio resource configuration.

Periods in time where neither "in-sync" nor "out-of-sync" is reported by layer 1 do not affect the evaluation of the number of consecutive "in-sync" or "out-of-sync" indications.

Regarding detection of radio link failure, the UE shall:
1> upon T310 expiry in PCell; or
1> upon random access problem indication from MCG MAC while neither T300, T301, T304 nor T311 is running; or
1> upon indication from MCG RLC that the maximum number of retransmissions has been reached:
2> consider radio link failure to be detected for the MCG i.e. RLF;
2> if AS security has not been activated:
3> perform the actions upon going to RRC_IDLE, with release cause 'other';
2> else:

3> initiate the connection re-establishment procedure.

The UE shall:

1> upon T310 expiry in PSCell; or

1> upon random access problem indication from SCG MAC; or

1> upon indication from SCG RLC that the maximum number of retransmissions has been reached:

2> consider radio link failure to be detected for the SCG i.e. SCG-RLF;

2> initiate the SCG failure information procedure to report SCG radio link failure.

UE actions upon going to RRC_IDLE are described.

UE shall:

1> reset MAC;

1> stop all timers that are running except T320 and T325;

1> discard any stored AS context, fullI-RNTI, shortI-RNTI-Value, ran-PagingCycle and ran-NotificationAreaInfo;

1> discard the AS security context including the KRR-Cenc key, the KRRCint, the KUPint key and the KUPenc key, if stored;

1> release all radio resources, including release of the RLC entity, the MAC configuration and the associated PDCP entity and SDAP for all established RBs;

1> indicate the release of the RRC connection to upper layers together with the release cause;

1> enter RRC_IDLE and perform procedures, except if going to RRC_IDLE was triggered by reception of the MobilityFromNRCommand message or by selecting an inter-RAT cell while T311 was running.

According to a prior art, a physical layer (also referred as layer 1 above) of a wireless device may transmit Out-Of-Sync (OOS) indication or In-Sync (IS) indication to RRC layer based on reference signal (RS) for Radio Link Monitoring procedure (hereinafter, RLM-RS). On unlicensed frequency, the network cannot transmit RLM-RS if it fails to occupy the unlicensed channel due to LBT failure. When the physical layer detects that the RLM-RS is not transmitted, there is no behavior defined regarding the RLM procedure, i.e. whether to transmit OOS indication or IS indication.

If the physical layer transmits the OOS indication when it detects that the RLM-RS is not transmitted, RLF will occur frequently. In other words, even though channel becomes good, the RRC layer may declare RLF because it receives enough OOS indication from physical layer.

If the physical layer transmits the IS indication when it detects that the RLM-RS is not transmitted, the RLF declaration may be delayed and the UE may undergo service interruption for much longer.

According to embodiments of the present disclosure, an operation of physical layer in case that the RLM-RS is not transmitted may be provided.

Figure 7:
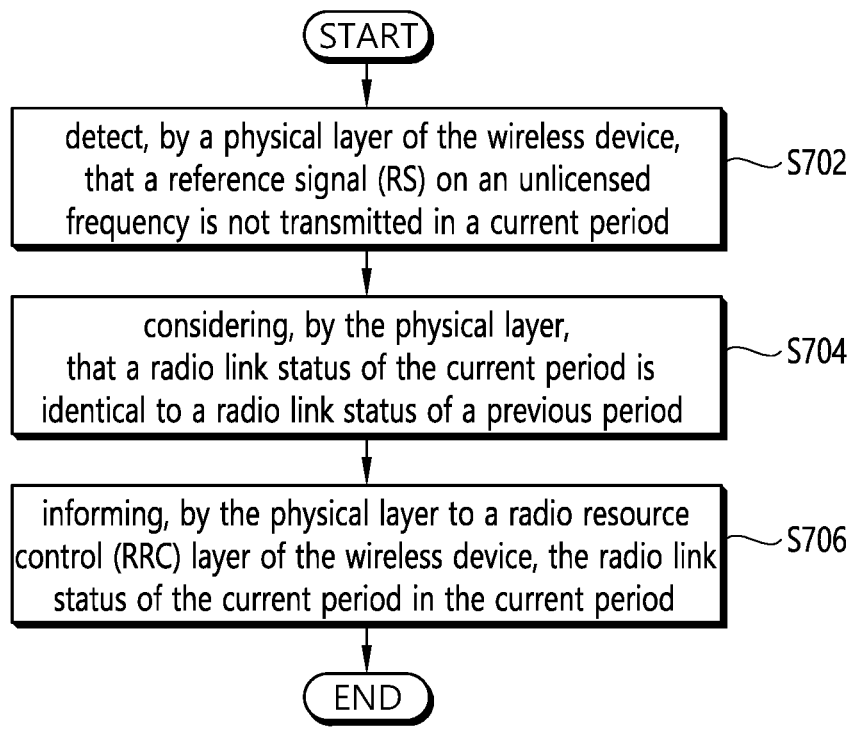
FIG. 7 shows a method for radio link monitoring according to an embodiment of the present disclosure.

FIG. 7 shows a method for radio link monitoring according to an embodiment of the present disclosure. In this embodiment, the wireless device may communicate with at least one of a mobile terminal, a network or autonomous vehicles other than the wireless device.

In step S702, a physical layer of the wireless device may detect that a reference signal (RS) on an unlicensed frequency is not transmitted in a current period. The RS may be at least one of a synchronization signal physical (SS)/broadcast channel (PBCH) block, a channel state information (CSI) reference signal (RS) or a discovery reference signal (DRS). The RS may be transmitted while the unlicensed frequency is occupied by a network.

In step S704, the physical layer may consider that a radio link status of the current period is identical to a radio link status of a previous period.

In step S706, the physical layer may inform to a radio resource control (RRC) layer of the wireless device the radio link status of the current period in the current period. The radio link status of the current period may inform one of Out-of-Sync (OOS) or In-Sync (IS). Further, the wireless device may start a timer upon the indicating the radio link status of the previous period. The considering and the informing steps are performed while the timer is running.

In previous period, the physical layer may detect that a RS on the unlicensed frequency is transmitted in the previous period. Further, the physical layer may inform to the RRC layer the radio link status of the previous period based on the detected RS. The starting the timer may include scaling a duration of the timer based on a number of consecutive transmissions of same indication.

According to embodiments of the present disclosure, the declaring unnecessary RLF may be prevented, by re-transmitting the indication transmitted in the previous period. Further, appropriate RLF without delaying may be declared.

In specific, if the physical layer transmits the OOS indication when it detects that the RLM-RS is not transmitted, RLF will occur frequently. I.e. though channel becomes good, RRC will declare RLF because it receives enough OOS indication from physical layer. On the contrary, if the physical layer transmits the IS indication when it detects that the RLM-RS is not transmitted, the RLF declaration may be delayed and the UE may undergo service interruption for much longer.

If OOS indication was transmitted in the previous RLM-RS timing, the OOS indication may be trigged in this time. So if the RLM-RS is not detected, the physical layer may decide whether to transmit the OOS or IS indication to RRC based on the previous transmission. In this description, RRC layer may be able not to declare unnecessary RLF and avoid excessive delay of RLF declaration by receiving OOS or IS indication predicted based on the previous indication from lower layer. So interruption time with serving cell can be minimized.

Figure 8:
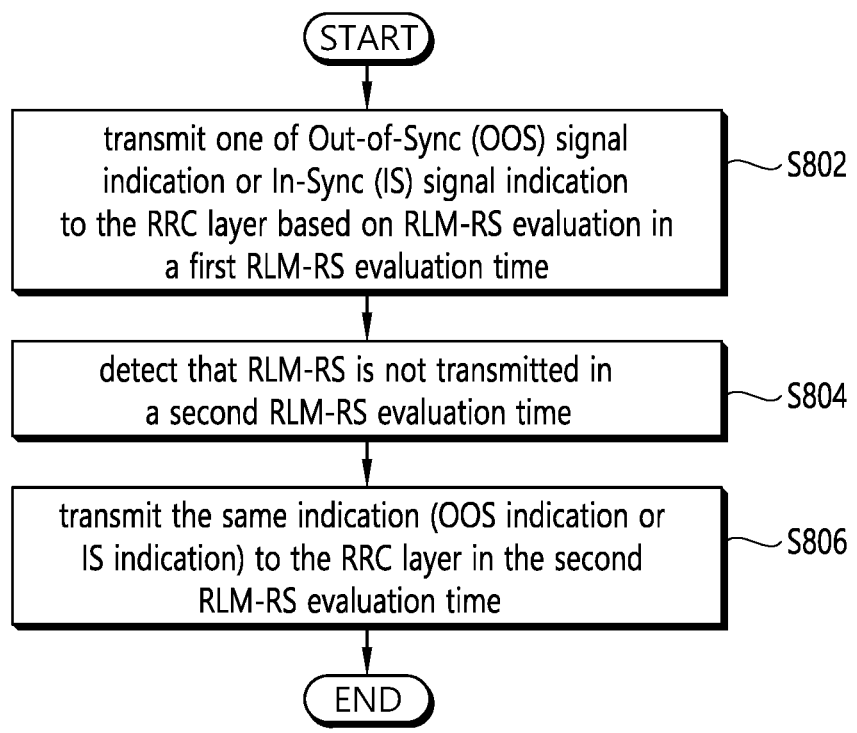
FIG. 8 shows a method for radio link monitoring according to an embodiment of the present disclosure.

FIG. 8 shows a method for radio link monitoring according to an embodiment of the present disclosure. In this embodiment, the physical layer may transmit OOS or IS indication which is same as that of previous RLM-RS evaluation period. In this embodiment, the RLM-RS may be at least one of SSB, CSI-RS or DRS.

In step S802, the physical layer may transmit one of Out-of-Sync (OOS) signal indication or In-Sync (IS) signal indication to the RRC layer based on RLM-RS evaluation in a first RLM-RS evaluation time.

In step S804, the physical layer may detect that RLM-RS is not transmitted in a second RLM-RS evaluation time.

In step S806, the physical layer may transmit the same indication (OOS indication or IS indication) to the RRC layer in the second RLM-RS evaluation time.

In specific, the physical layer may detect that the RLM-RS is not transmitted in this time. In that case, if the physical layer sent OOS indication to RRC layer based on the previous RLM-RS evaluation (regardless of whether the RLM-RS was transmitted or not in the previous transmitting time), the physical layer may transmit the OOS indication to the RRC layer. Else if the physical layer sent IS indication to RRC layer based on the previous RLM-RS evaluation (regardless of whether the RLM-RS was transmitted of not in the previous transmitting time), the physical layer may transmit the IS indication to the RRC layer.

According to embodiments of the present disclosure, the declaring unnecessary RLF may be prevented, by re-transmitting the indication transmitted in the previous period. Further, declaring appropriate RLF without delaying may be also guaranteed.

In specific, if the physical layer transmits the OOS indication when it detects that the RLM-RS is not transmitted, RLF will occur frequently. I.e. though channel becomes good, RRC will declare RLF because it receives enough OOS indication from physical layer. On the contrary, if the physical layer transmits the IS indication when it detects that the RLM-RS is not transmitted, the RLF declaration may be delayed and the UE may undergo service interruption for much longer.

If OOS indication was transmitted in the previous RLM-RS timing, the OOS indication may be trigged in this time. So if the RLM-RS is not detected, the physical layer may decide whether to transmit the OOS or IS indication to RRC based on the previous transmission. In this description, RRC layer may be able not to declare unnecessary RLF and avoid excessive delay of RLF declaration by receiving OOS or IS indication predicted based on the previous indication from lower layer. So interruption time with serving cell can be minimized.

Figure 9:
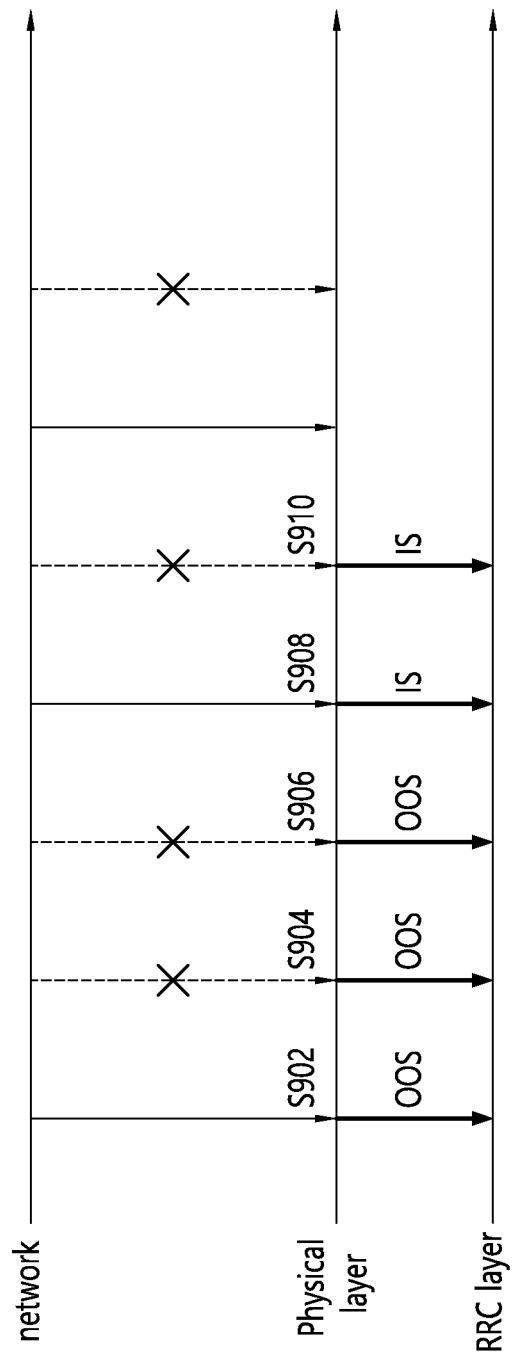
FIG. 9 shows an example of radio link monitoring according to an embodiment of the present disclosure.

FIG. 9 shows an example of radio link monitoring according to an embodiment of the present disclosure.

In step S902, the physical layer may receive RLM-RS successfully. The physical layer may evaluate the received RLM-RS to decide whether to transmit the OOS or IS indication to RRC layer. After the evaluation, the physical layer may transmit the OOS indication to the RRC layer.

In step S904, the physical layer may detect that the RLM-RS is not transmitted. The OOS indication may be transmitted to RRC layer in the previous RLM-RS evaluation timing, i.e. in step S902, so the physical layer may transmit the OOS indication to the RRC layer.

In step S906, the physical layer may detect that the RLM-RS is not transmitted. The OOS indication may be transmitted to RRC layer in the previous RLM-RS evaluation timing, i.e. in step S904, so the physical layer may transmit the OOS indication to the RRC layer.

In step S908, the physical layer may receive RLM-RS successfully. The physical layer may evaluate the received RLM-RS to decide whether to transmit the OOS or IS indication to RRC layer. After the evaluation, the physical layer may transmit the IS indication to the RRC layer.

In step S910, the physical layer may detect that the RLM-RS is not transmitted. The IS indication may be transmitted to RRC layer in the previous RLM-RS evaluation timing, i.e. in step S908, so the physical layer may transmit the IS indication to the RRC layer.

Alternatively, the physical layer may transmit the OOS indication to RRC layer only if the RLM-RS is detected and the received RLM-RS satisfies existing OOS condition. Similarly, the physical layer may transmit the IS indication to RRC layer only if the RLM-RS is detected and the received RLM-RS satisfies existing IS condition. If the PLM-RS is not detected, i.e., if the physical layer detects that the RLM-RS is not transmitted, the physical layer may not transmit the OOS indication or IS indication to the RRC layer. Desirably, in this case, the physical layer may be able to use the new indication to indicate that the RLM-RS is not transmitted to the RRC layer.

According to embodiments of the present disclosure, the declaring unnecessary RLF may be prevented, by re-transmitting the indication transmitted in the previous period. Further, declaring appropriate RLF without delaying may be also guaranteed.

In specific, if the physical layer transmits the OOS indication when it detects that the RLM-RS is not transmitted, RLF will occur frequently. I.e. though channel becomes good, RRC will declare RLF because it receives enough OOS indication from physical layer. On the contrary, if the physical layer transmits the IS indication when it detects that the RLM-RS is not transmitted, the RLF declaration may be delayed and the UE may undergo service interruption for much longer.

If OOS indication was transmitted in the previous RLM-RS timing, the OOS indication may be trigged in this time. So if the RLM-RS is not detected, the physical layer may decide whether to transmit the OOS or IS indication to RRC based on the previous transmission. In this description, RRC layer may be able not to declare unnecessary RLF and avoid excessive delay of RLF declaration by receiving OOS or IS indication predicted based on the previous indication from lower layer. So interruption time with serving cell can be minimized.

Figure 10:
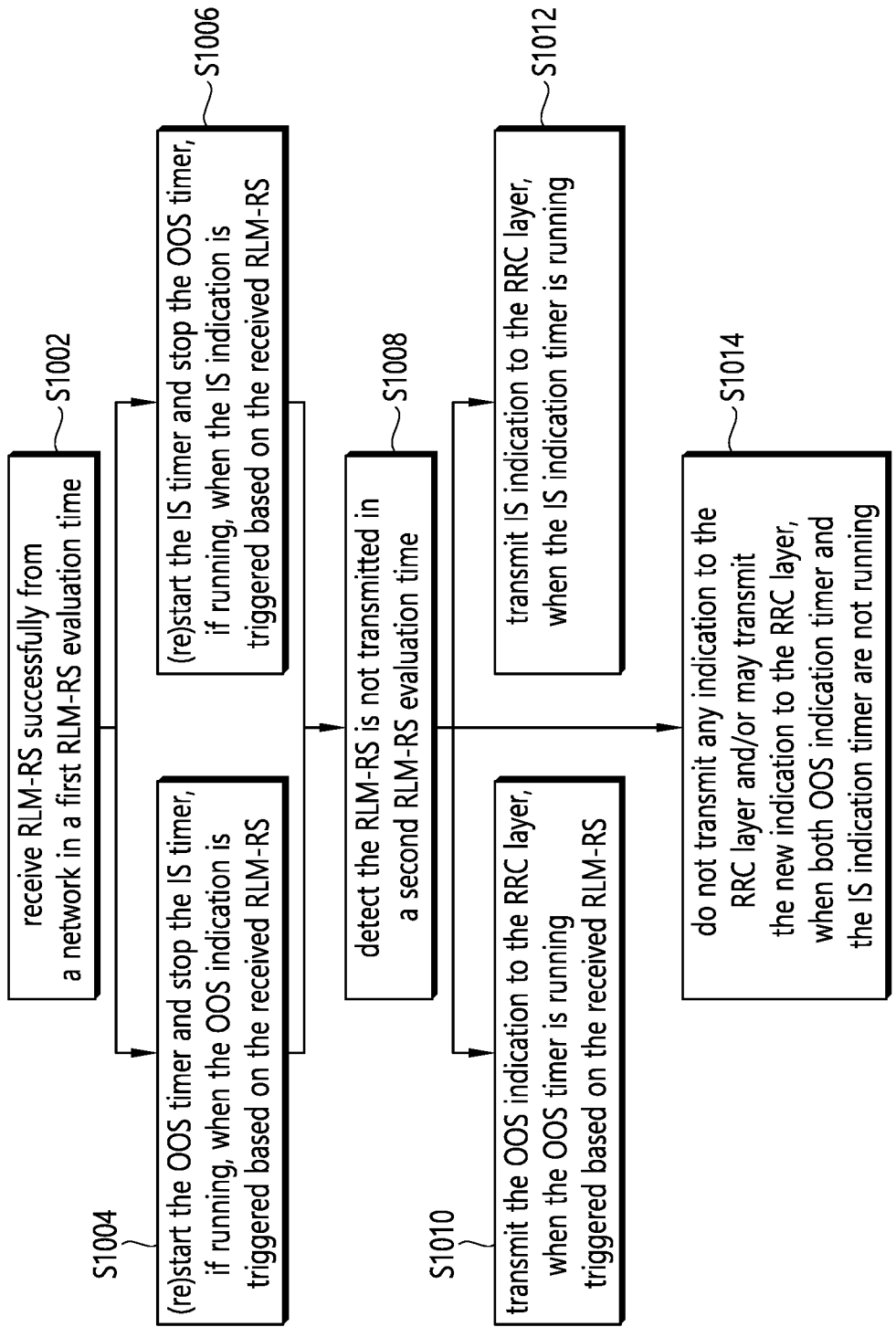
FIG. 10 shows a method for radio link monitoring according to an embodiment of the present disclosure.

FIG. 10 shows a method for radio link monitoring according to an embodiment of the present disclosure. In this embodiment, OOS/IS timer may be used in physical layer to decide whether to transmit the OOS/IS indication to the RRC layer. In this embodiment, the RLM-RS may be at least one of SSB, CSI-RS or DRS.

In step S1002, the physical layer may receive RLM-RS successfully from a network in a first RLM-RS evaluation time.

In step S1004, the physical layer may (re)start the OOS timer and stop the IS timer, if running, when the OOS indication is triggered based on the received RLM-RS. That is, if the OOS indication is triggered based on the received RLM-RS, i.e. the physical layer transmits the OOS indication to the RRC layer, the physical layer may start (or re-start, if running) the OOS timer and may stop the IS timer, if running.

In step S1006, the physical layer may (re)start the IS timer and stop the OOS timer, if running, when the IS indication is triggered based on the received RLM-RS. That is, else if the IS indication is triggered based on the received RLM-RS, i.e. the physical layer transmits the IS indication to the RRC layer, the physical layer may start (or re-start, if running) the IS timer and may stop the OOS timer, if running.

In step S1008, the physical layer may detect the RLM-RS is not transmitted in a second RLM-RS evaluation time. The second RLM-RS evaluation time may be subsequent evaluation time of the first RLM-RS evaluation time.

In step S1010, the physical layer may transmit the OOS indication to the RRC layer, when the OOS timer is running.

In step S1012, the physical layer may transmit IS indication to the RRC layer, when the IS indication timer is running.

In step S1014, the physical layer may not transmit any indication to the RRC layer and/or may transmit the new indication to the RRC layer, when both OOS indication timer and the IS indication timer are not running.

It may be assumed that the physical layer detects the RLM-RS is not transmitted in this RLM-RS transmission time. In this case, if the OOS timer is running, the physical layer may transmit the OOS indication to the RRC layer. Else if the IS timer is running, the physical layer may transmit the IS indication to the RRC layer. Else, (i.e. if OOS timer and IS timer are not running) the physical layer may not transmit the any indication to the RRC layer. In case that any indication is not transmitted, the physical layer may transmit the new indicator to RRC layer to indicate that the RLM-RS is not transmitted.

According to embodiments of the present disclosure, the declaring unnecessary RLF may be avoided, by re-transmitting the indication transmitted in the previous period. Also, declaring appropriate RLF may be performed without delay, by re-transmitting the indication transmitted in the previous period.

Figure 11:
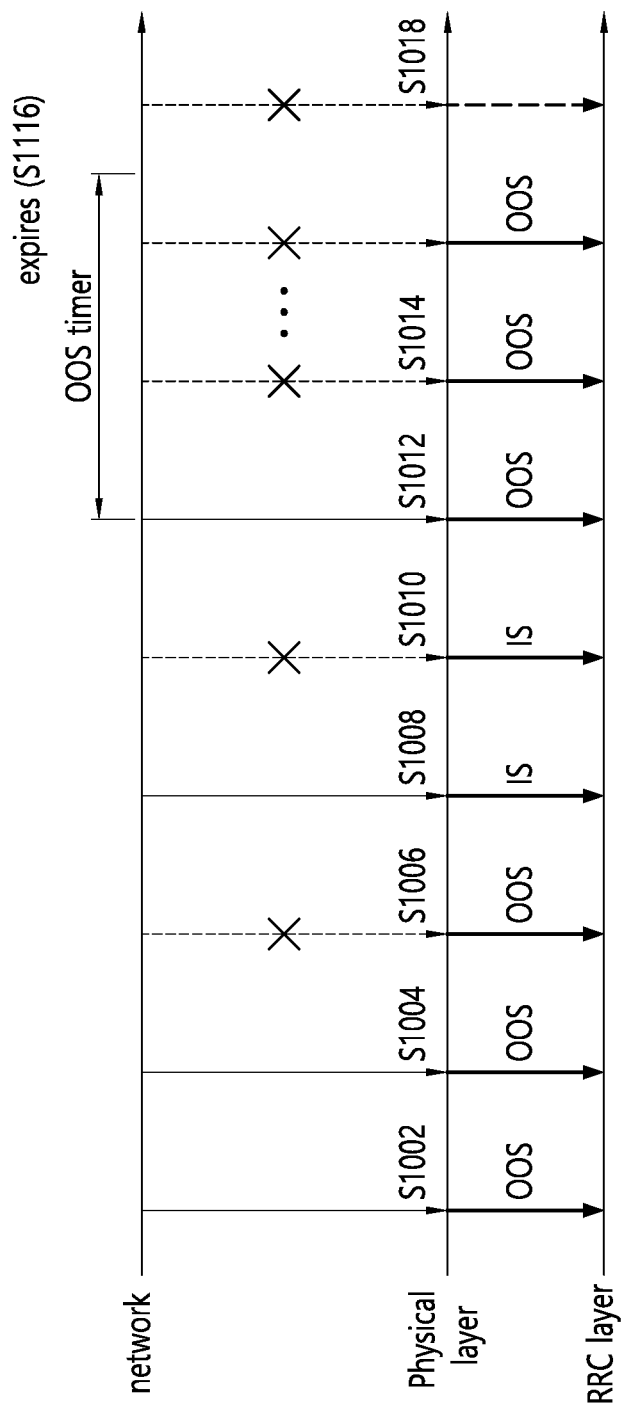
FIG. 11 shows an example of radio link monitoring according to an embodiment of the present disclosure.

FIG. 11 shows an example of radio link monitoring according to an embodiment of the present disclosure. FIG. 11 may illustrate an embodiment described in FIG. 10.

In step S1102, the physical layer may receive RLM-RS successfully. The physical layer may evaluate the received RLM-RS to decide whether to transmit the OOS or IS indication to RRC layer. After the evaluation, the physical layer may transmit the OOS indication to the RRC layer. Then the physical layer may start the OOS timer.

In step S1104, the physical layer may receive RLM-RS successfully and the OOS indication is triggered again. Because the OOS indication is triggered, so the physical layer may re-start the OOS timer.

In step S1106, the physical layer may detect that the RLM-RS is not transmitted while the OOS timer is running. Because the OOS timer is running, the physical layer may transmit the OOS indication to the RRC layer.

In step S1108, the physical layer may receive RLM-RS successfully, and the IS indication may be transmitted. Because the IS indication is transmitted, the physical layer may stop the OOS timer and may start IS timer.

In step S1110, the physical layer may detect that the RLM-RS is not transmitted while the IS timer is not running. Because the IS timer is running, the physical layer may transmit the IS indication to the RRC layer.

In step S1112, the physical layer may receive RLM-RS successfully, and the OOS indication may be transmitted. Because the OOS indication is transmitted, the physical layer may start the OOS timer and may stop the IS timer.

In step S1114, the physical layer may detect that the RLM-RS is not transmitted while the OOS timer is running. Because the OOS timer is running, the physical layer may transmit the OOS indication to the RRC layer.

In step S1116, the OOS timer may expire.

In step S1118, the physical layer may detect that the RLM-RS is not transmitted while the OOS timer is not running. Any one of the OOS timer and IS timer is not running, the physical layer may transmit the new indication to the RRC layer to indicate that the RLM-RS is not detected.

If OOS indication was transmitted in the previous RLM-RS timing, it may be that the OOS indication is trigged in this time rather than IS indication. On the contrary, in case that IS indication was transmitted in the previous RLM-RS timing, it may be that the IS indication is trigged in this time.

However, if physical layer decides whether to transmit OOS or IS indication to RRC only based on the indication transmitted previously when it does not detect the RLM-RS and when the RLM-RS is missed consecutively, the reliability will be decreased as the time goes. Therefore, it may be suggested that when the physical layer cannot detect the RLM, it may decide whether to transmit OOS or IS indication to RRC layer based on the indication transmitted previously only within a confidence interval. To achieve this, OOS/IS timer may be introduced. Based on the timer, the reliability of the indication predicted by UE may be improved and RRC can make correct decision for RLF declaration.

Figure 12:
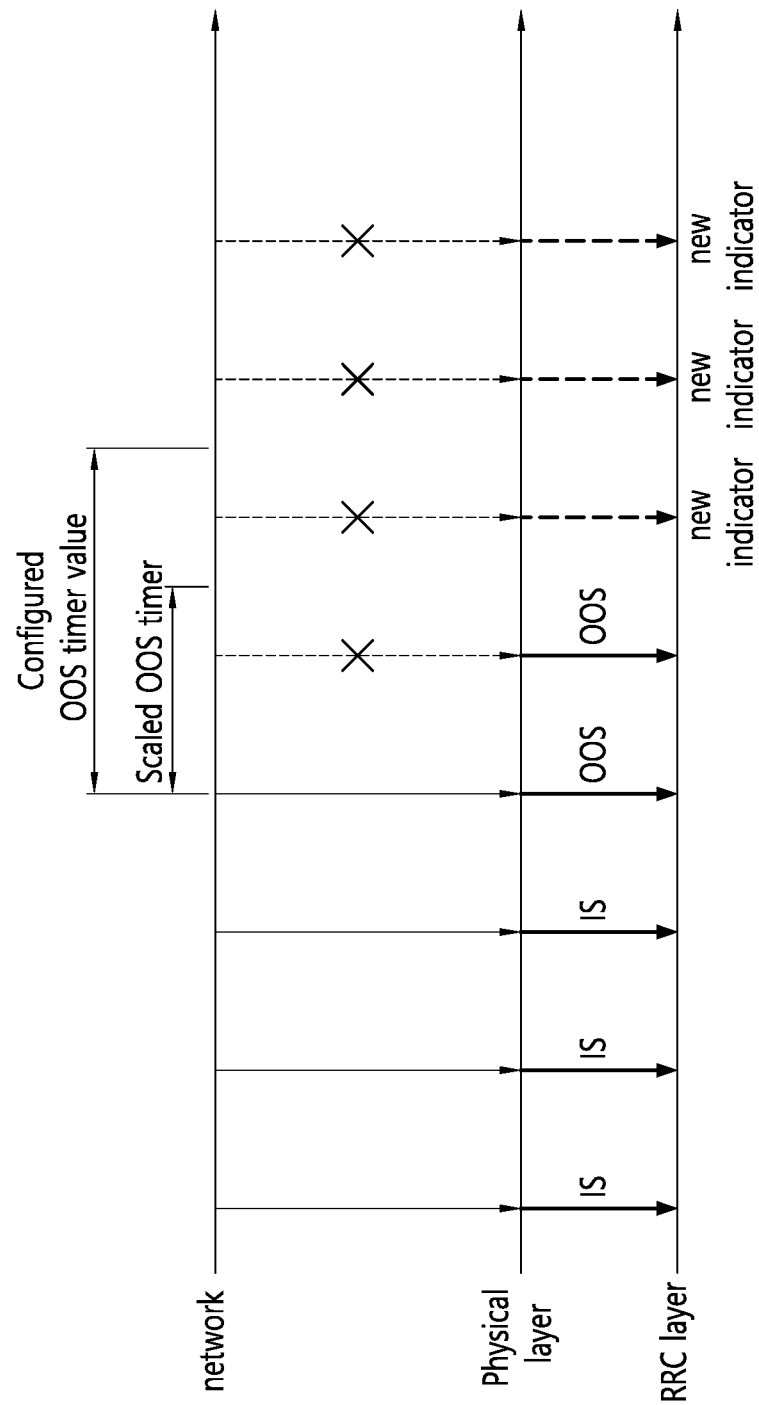
FIG. 12 shows an example of radio link monitoring according to the present disclosure.

FIG. 12 shows an example of radio link monitoring according to the present disclosure. In this embodiment, duration of OOS/IS timer may be scaled. In this embodiment, the UE may be not only a terminal device, but also any type of device operating as wireless device, for example an integrated access backhaul (IAB) node.

Referring to FIG. 12, before physical layer (re-)starts the OOS/IS timer, the UE may scale the length of the OOS/IS timer based on the number of consecutive OOS/IS indication that it has transmitted as follows, so that the length of the OOS/IS timer may be proportional to the number of consecutive OOS/IS indication.

The physical layer may scale the length of the OOS/IS timer by multiplying the configured OOS/IS timer length by scaling factor. The physical layer may choose a scaling factor which is mapped to the number of consecutive OOS/IS indication that the physical layer has transmitted.

The physical layer may transmit OOS indication just once after transmitting IS indication to RRC as shown in FIG. 12. The scaling factor corresponding to 1 may be 0.5. So the physical layer may scale the OOS timer value by multiplying the configured OOS timer length by 0.5. After that, the physical layer may start the OOS timer with scaled length.

Figure 13:
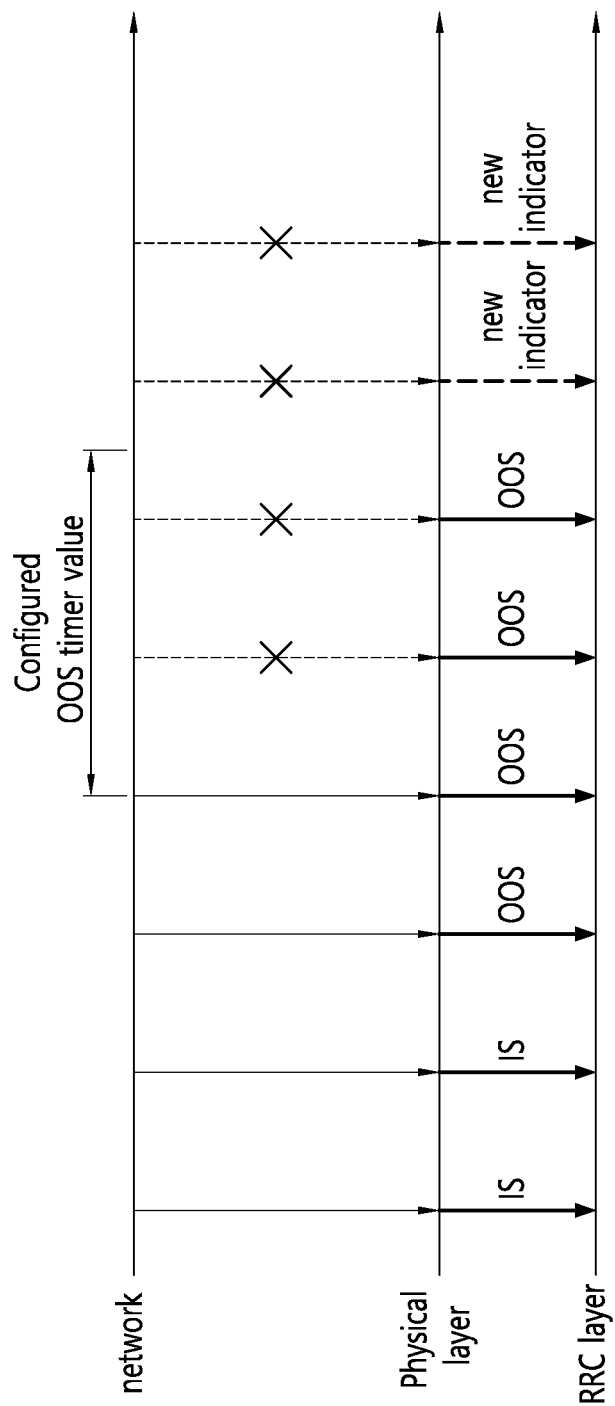
FIG. 13 shows an example of radio link monitoring according to the present disclosure.

FIG. 13 shows an example of radio link monitoring according to the present disclosure. In this embodiment, duration of OOS/IS timer may be scaled. In this embodiment, the UE may be not only a terminal device, but also any type of device operating as wireless device, for example an integrated access backhaul (IAB) node.

The physical layer may scale the length of the OOS/IS timer by multiplying the configured OOS/IS timer length by scaling factor. The physical layer may choose a scaling factor which is mapped to the number of consecutive OOS/IS indication that the physical layer has transmitted. Referring to FIG. 13, two-consecutive OOS indications may be transmitted as shown in FIG. 13. The scaling factor corresponding to 2 may be 1. So the physical layer re-starts the OOS timer without scaling.

Figure 14:
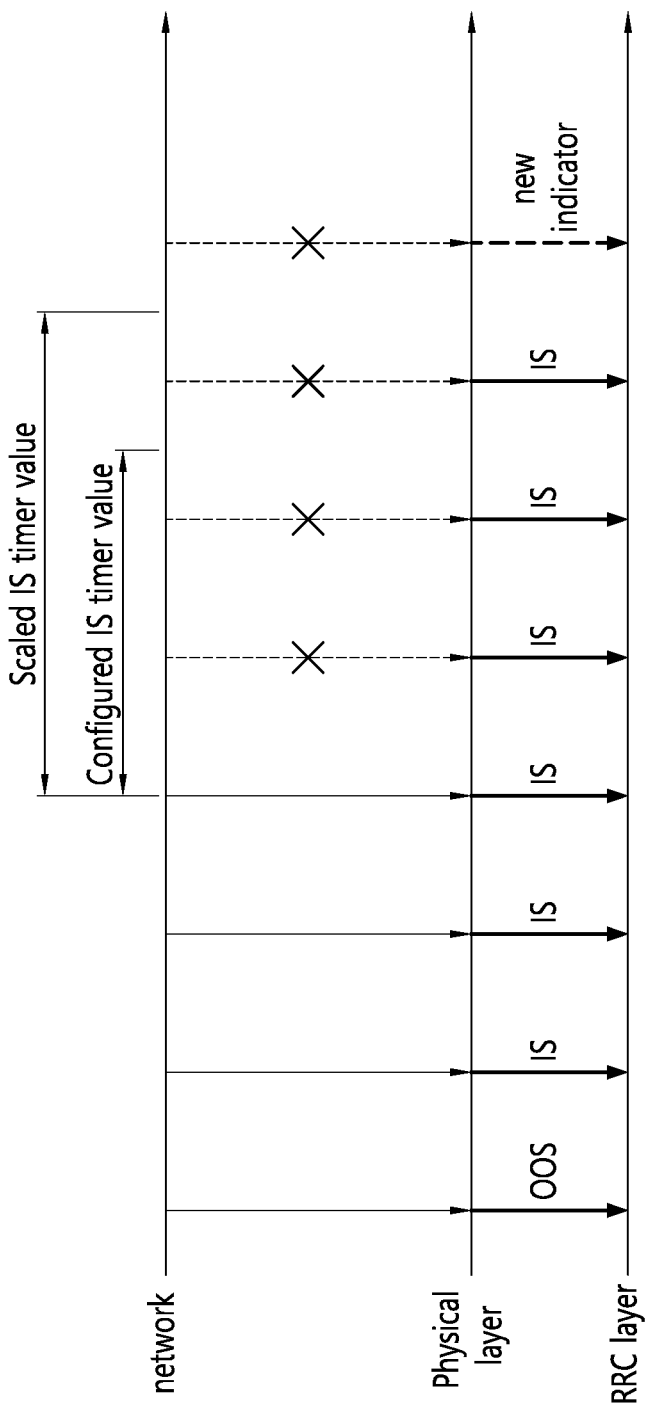
FIG. 14 shows an example of radio link monitoring according to the present disclosure.

FIG. 14 shows an example of radio link monitoring according to the present disclosure. In this embodiment, duration of OOS/IS timer may be scaled. In this embodiment, the UE may be not only a terminal device, but also any type of device operating as wireless device, for example an integrated access backhaul (IAB) node.

The physical layer may scale the length of the OOS/IS timer by multiplying the configured OOS/IS timer length by scaling factor. The physical layer may choose a scaling factor which is mapped to the number of consecutive OOS/IS indication that the physical layer has transmitted. Referring to FIG. 14, the physical layer may transmit three-consecutive IS indications after transmitting OOS indication to RRC as shown in FIG. 14. The scaling factor corresponding to 3 may be 1.5. So the physical layer may scale the IS timer value by multiplying the configured IS timer length by 1.5. After that, the physical layer may re-start the IS timer with scaled length.

According to embodiments of the present disclosure, by scaling the confidence interval based on the experiences, the reliability of the indication predicted by physical in UE may be improved and RRC can make correct decision for RLF declaration.

Figure 15:
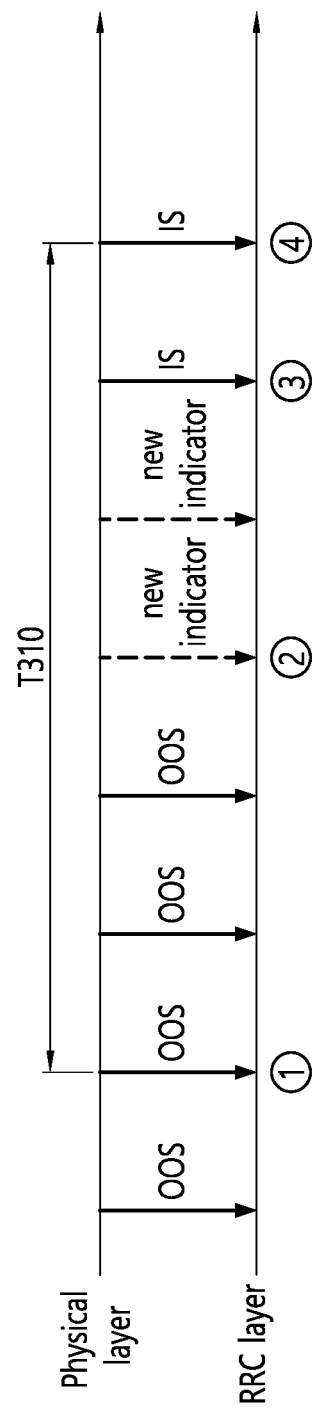
FIG. 15 shows an example of radio link monitoring according to an embodiment of the present disclosure.

FIG. 15 shows an example of radio link monitoring according to an embodiment of the present disclosure. In this embodiment, the physical layer may delay RLF declaration in RRC layer.

In case that the new indication is used, if RRC receives the new indication from lower layer, the physical layer may suspend T310, if running.

In case that the new indication is not used, if RRC doesn't receive any periodical indication, i.e. OOS or IS indication, from lower layer, the physical layer may suspend T310, if running.

If the RRC receives the OOS indication or IS indication from lower layer while T310 is suspended, the physical layer may resume the T310.

According to an embodiment of the present disclosure, the RRC layer may suspend T310 when it receives the new indication from lower layer (at ②). Referring to FIG. 15, at ③, the RRC layer may receive IS indication from lower layer and resume the T310. The RRC layer may receive N311(=3) consecutive IS indications before T310 expires, and the UE may avoid unnecessary RLF declaration.

Figure 16:
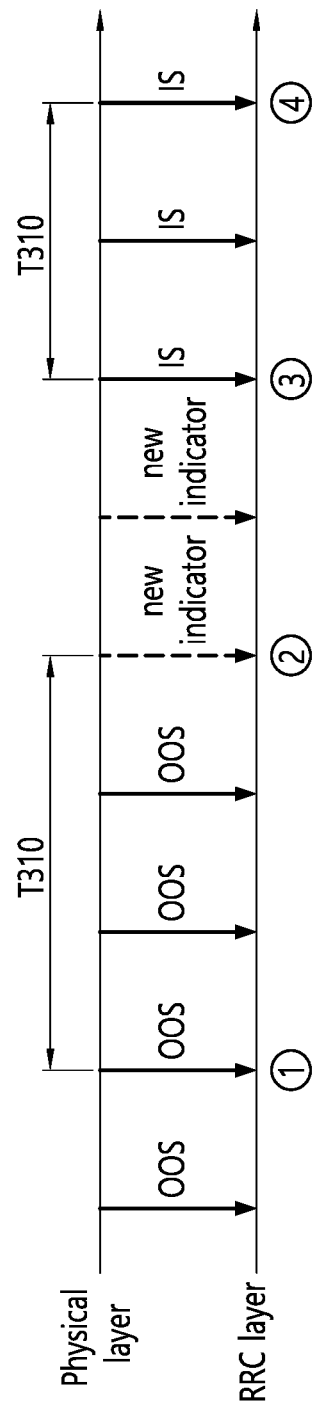
FIG. 16 shows an example of radio link monitoring according to the prior art.

FIG. 16 shows an example of radio link monitoring according to the prior art.

Referring to FIG. 16, even though the physical layer indicates that the RLM-RS is not transmitted, the T310 will be keep running. At ③, the radio link may be recovered and IS indication may be transmitted from lower layer but T310 expires before receiving N311(=3) consecutive IS indications, and the RRC layer may declare RLF. However, At ②, the channel may be already recovered. In this case, the UE may perform RRC connection re-establishment procedure to recover the RLF and undergo longer interruption with serving cell.

Figure 17:
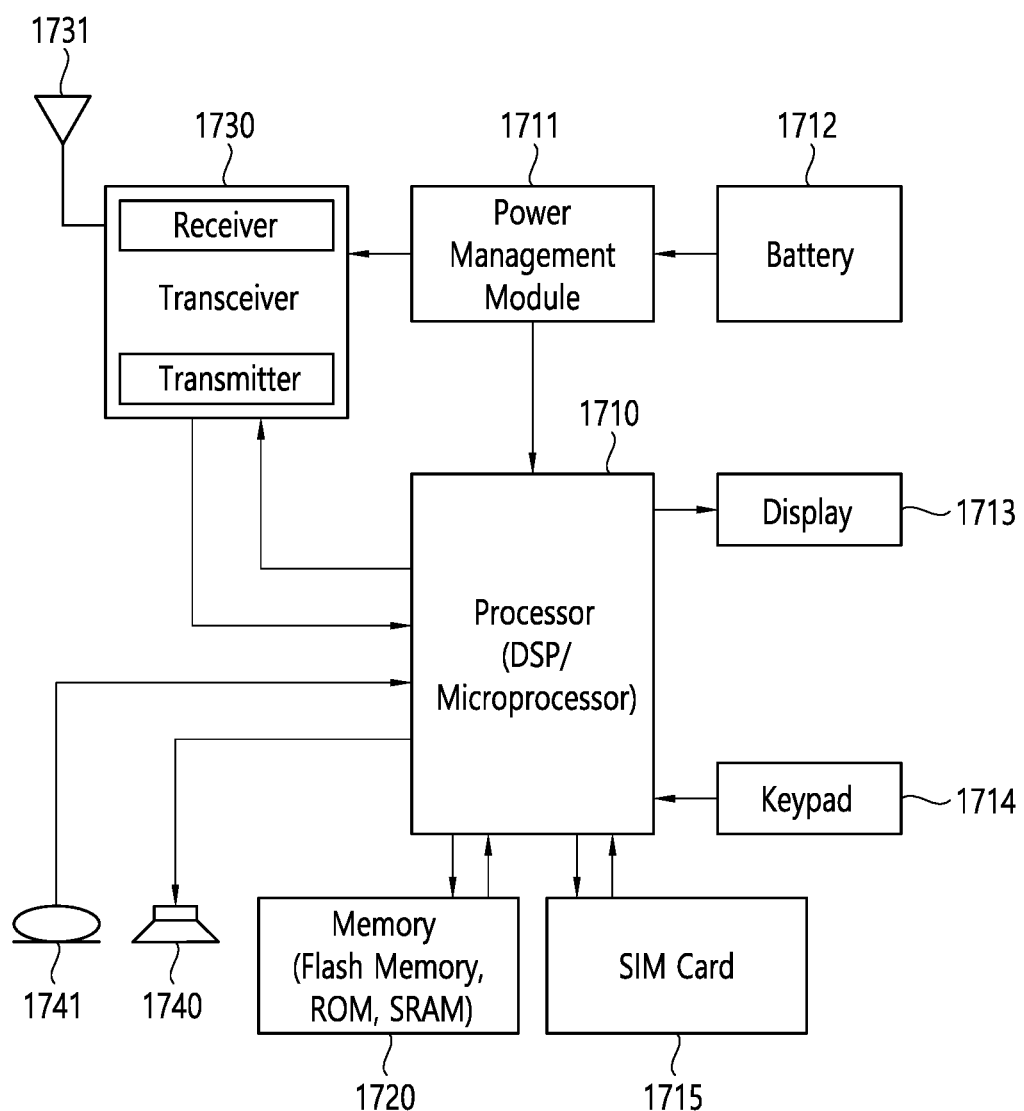
FIG. 17 shows more detailed wireless device to implement an embodiment of the present disclosure.

FIG. 17 shows more detailed wireless device to implement an embodiment of the present disclosure. The present disclosure described above for wireless device side may be applied to this embodiment.

A wireless device includes a processor 1710, a power management module 1711, a battery 1712, a display 1713, a keypad 1714, a subscriber identification module (SIM) card 1715, a memory 1720, a transceiver 1730, one or more antennas 1731, a speaker 1740, and a microphone 1741.

The processor 1710 may be configured to implement proposed functions, procedures and/or methods described in this description. Layers of the radio interface protocol may be implemented in the processor 1710. The processor 1710 may include ASIC, other chipset, logic circuit and/or data processing device. The processor 1710 may be an application processor (AP). The processor 1710 may include at least one of a digital signal processor (DSP), a central processing unit (CPU), a graphics processing unit (GPU), a modem (modulator and demodulator). An example of the processor 1710 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present disclosure, the processor 1710 may be configured in a physical layer of the wireless device. In this embodiment, the wireless device may communicate with at least one of a mobile terminal, a network or autonomous vehicles other than the wireless device. The processor 1710 may be configured to detect that a reference signal (RS) on an unlicensed frequency is not transmitted in a current period. The RS may be at least one of a synchronization signal physical (SS)/broadcast channel (PBCH) block, a channel state information (CSI) reference signal (RS) or a discovery reference signal (DRS). The RS may be transmitted while the unlicensed frequency is occupied by a network.

The processor 1710 may be configured to consider that a radio link status of the current period is identical to a radio link status of a previous period.

The processor 1710 may be configured to inform to a radio resource control (RRC) layer of the wireless device the radio link status of the current period in the current period. The radio link status of the current period may inform one of Out-of-Sync (OOS) or In-Sync (IS). Further, the wireless device may start a timer upon informing the radio link status of the previous period. The considering step and the informing step are performed while the timer is running.

In previous period, the processor 1710 may be configured to detect that a RS on the unlicensed frequency is transmitted in the previous period. Further, the processor 1710 may be configured to inform to the RRC layer the radio link status of the previous period based on the detected RS. The starting the timer may include scaling a duration of the timer based on a number of consecutive transmissions of same indication.

According to embodiments of the present disclosure, the declaring unnecessary RLF may be prevented, by re-transmitting the indication transmitted in the previous period. Further, appropriate RLF without delaying may be declared.

The power management module 1711 manages power for the processor 1710 and/or the transceiver 1730. The battery 1712 supplies power to the power management module 1711. The display 1713 outputs results processed by the processor 1710. The keypad 1714 receives inputs to be used by the processor 1710. The keypad 1714 may be shown on the display 1713. The SIM card 1715 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1720 is operatively coupled with the processor 1710 and stores a variety of information to operate the processor 1710. The memory 1720 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 1720 and executed by the processor 1710. The memory 1720 can be implemented within the processor 1710 or external to the processor 1710 in which case those can be communicatively coupled to the processor 1710 via various means as is known in the art.

The transceiver 1730 is operatively coupled with the processor 1710, and transmits and/or receives a radio signal. The transceiver 1730 includes a transmitter and a receiver. The transceiver 1730 may include baseband circuitry to process radio frequency signals. The transceiver 1730 controls the one or more antennas 1731 to transmit and/or receive a radio signal.

The speaker 1740 outputs sound-related results processed by the processor 1710. The microphone 1741 receives sound-related inputs to be used by the processor 1710.

The embodiments of the disclosure may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 18:
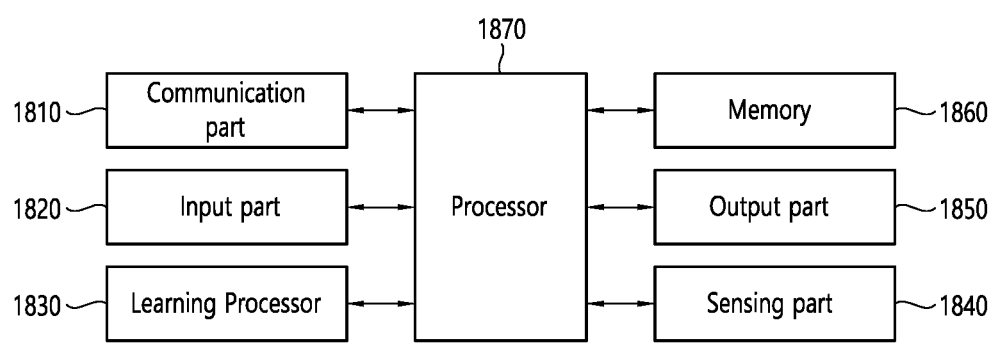
FIG. 18 shows an example of an AI device to which the technical features of the present disclosure can be applied.

FIG. 18 shows an example of an AI device to which the technical features of the disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc.

The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
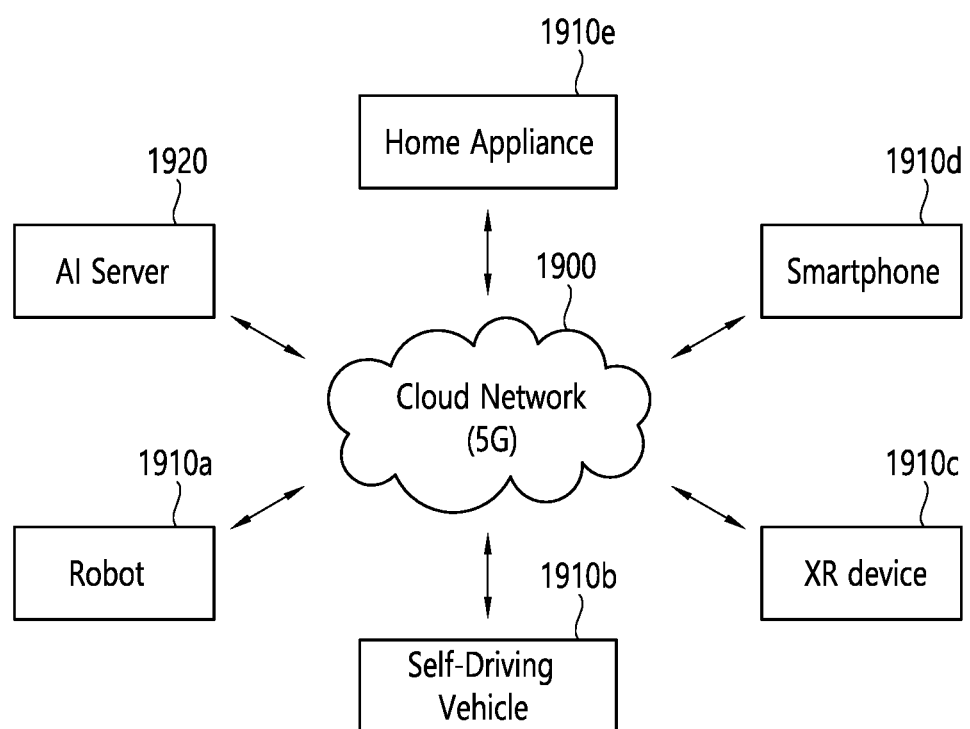
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1920, a robot 1910a, an autonomous vehicle 1910b, an XR device 1910c, a smartphone 1910d and/or a home appliance 1910e is connected to a cloud network 1900. The robot 1910a, the autonomous vehicle 1910b, the XR device 1910c, the smartphone 1910d, and/or the home appliance 1910e to which the AI technology is applied may be referred to as AI devices 1910a to 1910e.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910a to 1910e and 1920 consisting the AI system may be connected to each other through the cloud network 1900. In particular, each of the devices 1910a to 1910e and 1920 may communicate with each other through a base station, but may directly communicate with each other without using a base station.

The AI server 1920 may include a server for performing AI processing and a server for performing operations on big data. The AI server 1920 is connected to at least one or more of AI devices constituting the AI system, i.e. the robot 1910a, the autonomous vehicle 1910b, the XR device 1910c, the smartphone 1910d and/or the home appliance 1910e through the cloud network 1900, and may assist at least some AI processing of the connected AI devices 1910a to 1910e. The AI server 1920 can learn the ANN according to the machine learning algorithm on behalf of the AI devices 1910a to 1910e, and can directly store the learning models and/or transmit them to the AI devices 1910a to 1910e. The AI server 1920 may receive the input data from the AI devices 1910a to 1910e, infer the result value with respect to the received input data using the learning model, generate a response and/or a control command based on the inferred result value, and transmit the generated data to the AI devices 1910a to 1910e. Alternatively, the AI devices 1910a to 1910e may directly infer a result value for the input data using a learning model, and generate a response and/or a control command based on the inferred result value.

Various embodiments of the AI devices 1910a to 1910e to which the technical features of the present disclosure can be applied will be described. The AI devices 1910a to 1910e shown in FIG. 19 can be seen as specific embodiments of the AI device 1800 shown in FIG. 18.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   detecting, by a physical layer of the wireless device, that a reference signal (RS) on an unlicensed frequency is not transmitted in a current period;
   considering, by the physical layer, that a radio link status of the current period is identical to a radio link status of a previous period; and
   informing, by the physical layer to a radio resource control (RRC) layer of the wireless device, the radio link status of the current period in the current period.

2. The method of claim 1, wherein the RS is at least one of a synchronization signal physical (SS)/broadcast channel (PBCH) block, a channel state information (CSI) reference signal (RS) or a discovery reference signal (DRS).

3. The method of claim 1, wherein the RS is transmitted while the unlicensed frequency is occupied by a network.

4. The method of claim 1, wherein the radio link status of the current period informs one of Out-of-Sync (OOS) or In-Sync (IS).

5. The method of claim 1, further comprising:
   starting a timer upon informing the radio link status of the previous period.

6. The method of claim 5, further comprising:
   detecting that a RS on the unlicensed frequency is transmitted in the previous period; and
   informing, to the RRC layer, the radio link status of the previous period based on the detected RS.

7. The method of claim 5, wherein the considering step and the informing step are performed while the timer is running.

8. The method of claim 5, wherein the starting the timer includes scaling a duration of the timer based on a number of consecutive transmissions of same indication.

9. The method of claim 1, wherein the wireless device communicates with at least one of a mobile terminal, a network or autonomous vehicles other than the wireless device.

10. A wireless device in a wireless communication system, the wireless device comprising:
    a memory;
    a transceiver; and
    a processor, operably coupled to the memory and the transceiver, and configured to:
    detect, by a physical layer of the wireless device, that a reference signal (RS) on an unlicensed frequency is not transmitted in a current period;
    consider, by the physical layer, that a radio link status of the current period is identical to a radio link status of a previous period; and
    inform, by the physical layer to a radio resource control (RRC) layer of the wireless device, the radio link status of the current period in the current period.

11. The wireless device of claim 10, wherein the RS is at least one of a synchronization signal physical (SS)/broadcast channel (PBCH) block, a channel state information (CSI) reference signal (RS) or a discovery reference signal (DRS).

12. The wireless device of claim 10, wherein the RS is transmitted while the unlicensed frequency is occupied by a network.

13. The wireless device of claim 10, wherein the radio link status of the current period indicates one of Out-of-Sync (OOS) or In-Sync (IS).

14. The wireless device of claim 10, wherein the processor is further configured to:
    start a timer upon indicating the radio link status of the previous period.

15. The wireless device of claim 14, wherein the processor is further configured to:
    detect, by the physical layer, that a RS on the unlicensed frequency is transmitted in the previous period; and
    indicate, by the physical layer to the RRC layer, the radio link status of the previous period based on the detected RS.

* * * * *